US012698036B2

(12) United States Patent
Kojima et al.

(10) Patent No.: US 12,698,036 B2
(45) Date of Patent: Aug. 4, 2026

(54) VEHICLE BODY FASTENER STRUCTURE

(71) Applicant: SUBARU CORPORATION, Tokyo (JP)

(72) Inventors: Ryo Kojima, Tokyo (JP); Kyosuke Hirazumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 295 days.

(21) Appl. No.: 18/737,103

(22) Filed: Jun. 7, 2024

(65) Prior Publication Data

US 2025/0026411 A1 Jan. 23, 2025

(30) Foreign Application Priority Data

Jul. 18, 2023 (JP) ................................. 2023-116794

(51) Int. Cl.
B62D 24/00 (2006.01)
B62D 21/11 (2006.01)
(Continued)

(52) U.S. Cl.
CPC .............. B62D 24/00 (2013.01); B62D 21/11 (2013.01); B62D 21/155 (2013.01); B62D 25/085 (2013.01); B62D 27/065 (2013.01)

(58) Field of Classification Search
CPC ........ B62D 24/00; B62D 21/02; B62D 21/11; B62D 21/15; B62D 21/152; B62D 21/155;
(Continued)

(56) References Cited

U.S. PATENT DOCUMENTS 9,266,563 B1 * 2/2016 Han ........................ B62D 21/00
9,650,074 B2 * 5/2017 Shirooka .............. B62D 25/082
(Continued)

FOREIGN PATENT DOCUMENTS

JP H07257425 A * 10/1995
JP 2007283992 A * 11/2007
(Continued)

OTHER PUBLICATIONS

Translation JP-H07257425 (Year: 1995).*
Translation JP-2007283992 (Year: 2007).*
Translation JP-2016141339 (Year: 2016).*

*Primary Examiner* — Amy R Weisberg
*Assistant Examiner* — Denise Lynne Esquivel
(74) *Attorney, Agent, or Firm* — McGinn IP Law Group, PLLC

(57) ABSTRACT

A vehicle body fastener structure includes: a vehicle body frame on a vehicle body; a sub-frame including an attachment portion attached to the vehicle body frame; a welding pipe nut coupled to the vehicle body frame; and a bolt fastening the attachment portion to the welding pipe nut. The welding pipe nut includes a pipe inserted through the vehicle body frame and having a female thread, and a coupling flange provided at a base of the pipe and coupled to the vehicle body frame. The attachment portion is fastened to the welding pipe nut with the bolt threaded into the female thread, the coupling flange is coupled to the vehicle body frame. A boss protrudes from a surface of the coupling flange. A seat surface is provided on an end surface of the boss. The attachment portion abuts against the seat surface and is fastened with the bolt.

8 Claims, 11 Drawing Sheets

(51) Int. Cl.
    *B62D 21/15*       (2006.01)
    *B62D 25/08*       (2006.01)
    *B62D 27/06*       (2006.01)

(58) Field of Classification Search
    CPC .... B62D 27/065; B62D 25/08; B62D 25/082;
                                    B62D 25/085
    USPC ... 296/35.1, 187.09, 203.02, 203.04, 193.09,
                                       296/204
    See application file for complete search history.

(56)                 References Cited

U.S. PATENT DOCUMENTS 9,751,565 B2 *   9/2017   Tatsuwaki .............. B62D 21/11
2021/0261195 A1 *   8/2021   Okamoto ............. B62D 21/155

FOREIGN PATENT DOCUMENTS

JP          2016141339 A  *  8/2016
JP          6337342 B    6/2018

* cited by examiner

VEHICLE BODY FASTENER STRUCTURE

CROSS-REFERENCE TO RELATED APPLICATIONS

The present application claims priority from Japanese Patent Application No. 2023-116794 filed on Jul. 18, 2023, the entire contents of which are hereby incorporated by reference.

BACKGROUND

The disclosure relates to a vehicle body fastener structure.

When fastening a sub-frame to a vehicle body frame, if rigidity of a fastener is improved, for example, when the sub-frame is a suspension cross member, an input from a road surface that a suspension receives can be smoothly transmitted to a vehicle body side. Accordingly, a delay in a steering response or the like can be improved.

In the related art, for example, an attachment portion of the suspension cross member abuts against a lower surface of the vehicle body frame, and is fastened to a nut welded to the vehicle body frame with a bolt. The nut is often welded to a surface of the suspension cross member on a side opposite to the attachment portion of the suspension cross member with the vehicle body frame sandwiched therebetween. A spot-welding nut is often used as the nut.

When spot-welding the spot-welding nut to the vehicle body frame, a coupling surface of the spot-welding nut and the vehicle body frame are sandwiched between electrodes, and an inside of a coupling member is melted by heat generated by electrical resistance. When a melt is cooled, a nugget is formed, and the coupling surface of the spot-welding nut and the vehicle body frame are coupled to each other by the nugget.

A recess (dent) is formed in a member of the vehicle body frame and the spot-welding nut that is pressed by the electrode due to thermal deformation. A slightly raised impression is formed around the recess. When the attachment portion of the suspension cross member abuts against the vehicle body frame and is fastened with the bolt, the attachment portion is pressed against an impressed portion formed on a side of the vehicle body frame. Since the impressed portion is raised from the vehicle body frame, the attachment portion is fastened in such a manner that a part thereof is located on the impressed portion.

When the attachment portion is fastened in such a manner that a part thereof is located on the impressed portion, a part of the attachment portion floats with respect to a joint surface of the vehicle body frame except for the impressed portion, and fastening rigidity is lowered. When the fastening rigidity is lowered, and when torsion occurs in the attachment portion of the suspension cross member due to a suspension stroke and a vibration of a power unit (engine, electric motor), a stress in a pry direction (a direction orthogonal to a center line) becomes easily concentrated on the fastener between the attachment portion and the impressed portion.

A height of the impressed portion varies for each spot weld. When the height of the impressed portion is high, rigidity of the fastener is further lowered, which results in reduction in steering stability, a reduction in riding comfort, and reduction in steering responsiveness.

For example, in Japanese Patent No. 6337342, a pipe nut is inserted through and protrudes from a through hole formed in a vehicle body frame from below, and a flange formed at a base end abuts against a lower surface of the vehicle body frame. A technique of coupling an outer periphery of the flange by arc welding is disclosed.

SUMMARY

An aspect of the disclosure provides a vehicle body fastener structure. The vehicle body fastener structure includes a vehicle body frame, a welding pipe nut, and a bolt. The vehicle body frame is disposed on a vehicle body. The sub-frame includes an attachment portion attached to the vehicle body frame. The welding pipe nut is coupled to the vehicle body frame. The bolt fastens the attachment portion of the sub-frame to the welding pipe nut. The welding pipe nut includes a pipe inserted through the vehicle body frame from an outside and having a female thread, and a coupling flange provided at a base of the pipe and coupled to an outer surface of the vehicle body frame. The attachment portion of the sub-frame is fastened to the welding pipe nut with the bolt threaded into the female thread, the coupling flange is coupled to the outer surface of the vehicle body frame by spot welding. A boss protrudes from a surface of the coupling flange facing the pipe across the coupling flange. A seat surface is provided on an end surface of the boss. The attachment portion of the sub-frame abuts against the seat surface and is fastened with the bolt.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
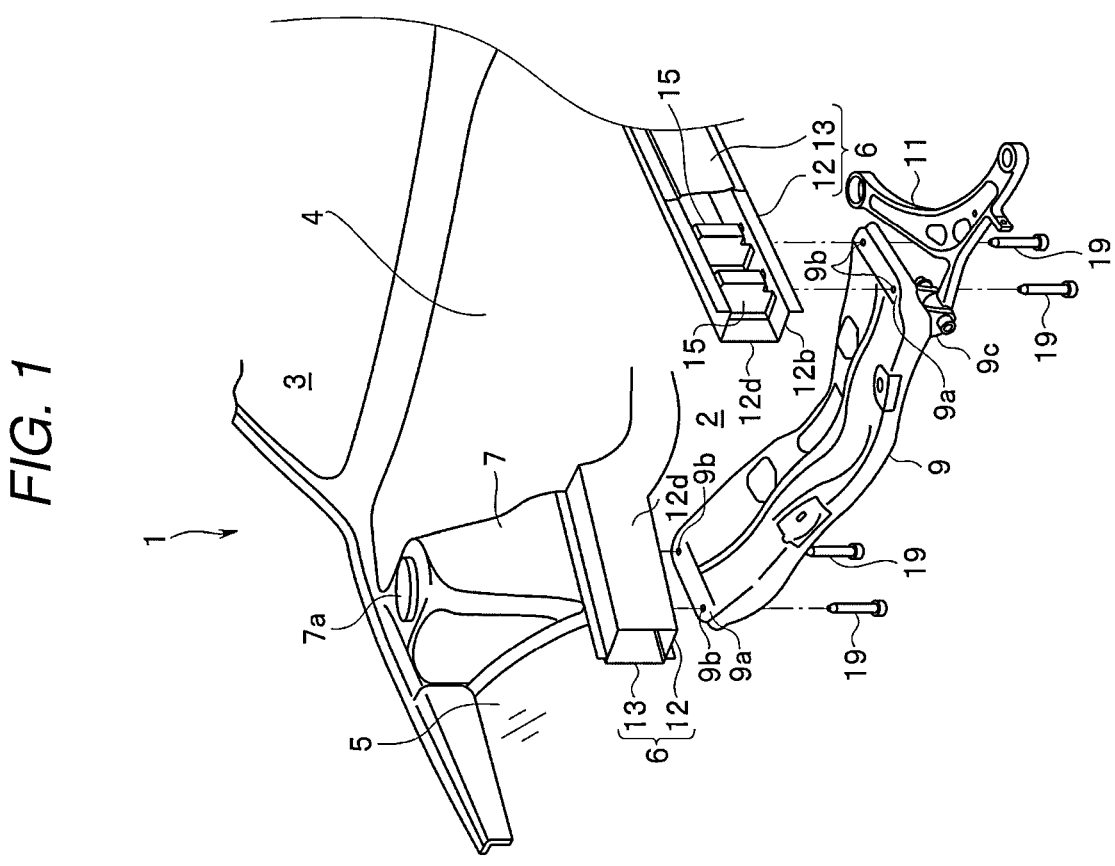
FIG. 1 is an exploded perspective view of a vehicle body front frame and a suspension cross member according to an embodiment.
Figure 2:
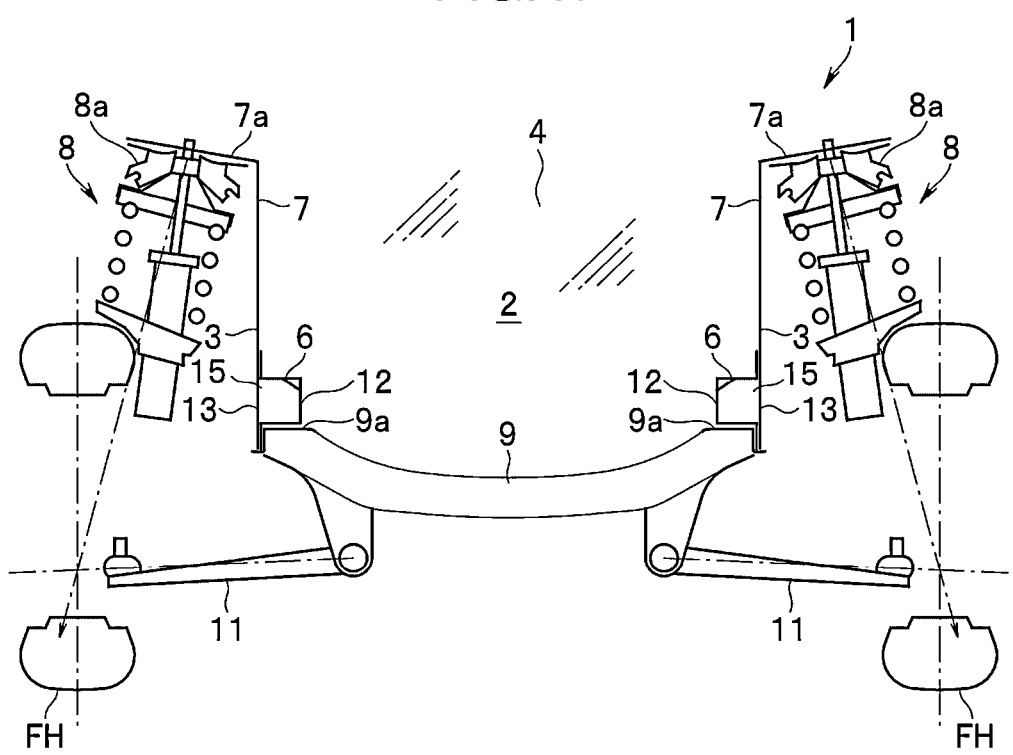
FIG. 2 is a front view of main parts of the vehicle body front frame.
Figure 3:
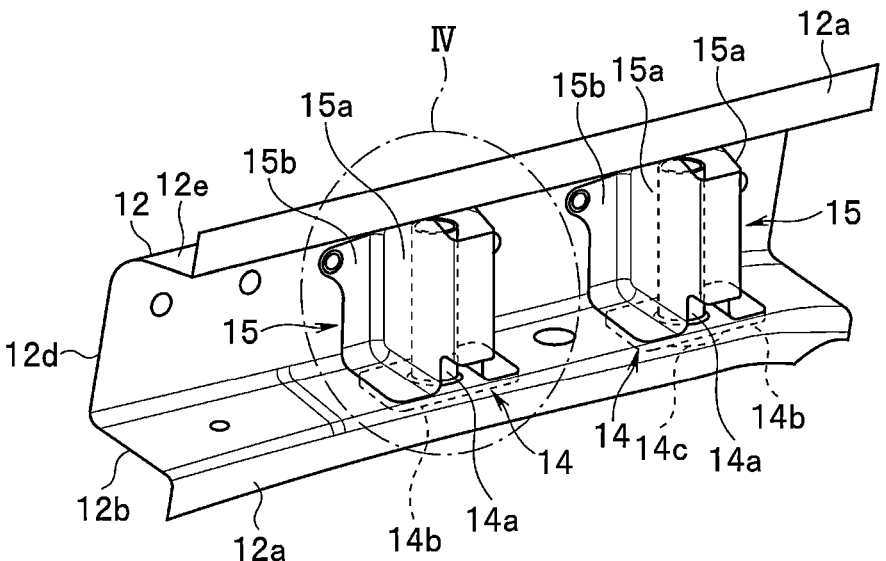
FIG. 3 is a perspective view illustrating a state in which a spot-welding pipe nut and a separator are coupled to a front side frame.

In the technique disclosed in JP-B No. 6337342, substantially the whole flange formed on a base of the pipe nut can be coupled to the vehicle body frame, so that rigidity of a fastener can be improved.

In the technique disclosed in JP-B No. 6337342, the flange formed on the pipe nut is coupled to the vehicle body frame by arc welding. However, arc welding has a problem of inferior stability in welding quality as compared with spot welding.

In the arc welding, sputtering occurs during welding. The flange is provided with a seat surface against which an attachment portion of a suspension cross member abuts. Therefore, during arc welding, it is intended to protect the seat surface with a masking material so as to prevent adhesion of sputtering. In order to protect the seat surface provided on the flange with the masking material, a separate process of attaching and detaching the masking material is intended before and after the arc welding process. In the technique disclosed in JP-B No. 6337342, a separate process of attaching and detaching the masking material is intended, which increases the number of work steps and causes a reduction in production efficiency.

It is desirable to provide a vehicle body fastener structure in which rigidity of a fastener between a vehicle body frame and a sub-frame is not reduced, stability of welding quality is maintained, and productivity is high, when a nut is coupled to a vehicle body frame by spot welding.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

FIGS. 1 to 12 illustrate a first embodiment of the disclosure. Reference sign 1 in FIGS. 1 and 2 denotes a vehicle body front of a vehicle. A power unit room 2 is provided at the vehicle body front 1. The power unit room 2 and a rear cabin 3 are partitioned by a toe board 4. In the following description, when "coupling" is mentioned, a coupling method is, for example, welding using spot welding unless otherwise specified. In the drawings, spot-welding symbols are attached to spot-welding points indicating characteristics, and spot-welding symbols are omitted for other spot-welding points.

A right and left of the power unit room 2 are partitioned by a front wheel apron 5. Inside the front wheel apron 5, front side frames (hereinafter referred to as "side frames") 6 serving as a pair of left and right vehicle body frames are disposed. The side frames 6 extend toward a front and rear of a vehicle body. A middle of the side frame 6 extending rearward is coupled to the toe board 4.

A strut tower 7 is provided on a rear of the front wheel apron 5. A strut suspension (hereinafter, simply referred to as a "suspension") is accommodated in the strut tower 7. A strut support 7a is provided at an upper member of the strut tower 7. An upper member of the suspension 8 is supported by the strut support 7a via a strut upper mount 8a.

A suspension cross member 9 is disposed as a sub-frame at a lower member of the power unit room 2. The suspension cross member 9 is disposed at a position that substantially coincides with the suspension 8 in a vehicle width direction. A peripheral edge of the suspension cross member 9 is bent downward. Both sides of the suspension cross member 9 in the vehicle width direction are inclined upward. Flat attachment portions 9a are provided at both ends of the suspension cross member 9 in the vehicle width direction. A reinforcement 10 is coupled to a rear surface of the attachment portion 9a. Although not illustrated, a power unit such as an engine and an electric motor is supported by the suspension cross member 9 via a power unit mount or the like.

Arm supports 9c protrude from lower surfaces of both ends of the suspension cross member 9 in the vehicle width direction. A base of a suspension lower arm (hereinafter, simply referred to as a "lower arm") 11 is supported by the arm support 9c so as to be freely swingable in an upper-lower direction. The lower member of the suspension 8 is supported on a tip end side of the lower arm 11, and a wheel hub (not illustrated) that fixes a front wheel FH is rotatably supported.

As illustrated in FIGS. 1 to 6, each of the left and right side frames 6 includes an inner frame 12 and an outer frame 13. The inner frame 12 is disposed inward in the vehicle width direction, and the outer frame 13 is disposed outward in the vehicle width direction. In FIG. 1, a part of the outer frame 13 of the left side frame 6 is omitted for convenience.

The inner frame 12 has a hat shape in cross section. The outer frame 13 has a hat shape having a depth shallower than that of the inner frame 12 in cross section. Opening sides of the frames 12 and 13 are opposed to each other. Flanges 12a and 13a, which are provided on upper and lower sides of the frames 12 and 13, are coupled to each other to form a closed cross section.

The rears of the left and right side frames 6 each include a kick whose height direction gradually decreases rearward, and the kick is coupled to the toe board 4. A lower member of the front wheel apron 5 is coupled to an outer side surface of the outer frame 13 in the vehicle width direction.

The attachment portions 9a, which are provided on both sides of the suspension cross member 9 in the vehicle width direction, abut against a lower side surface 12b of the inner frame 12, which is a component of the side frame 6.

Figure 8:
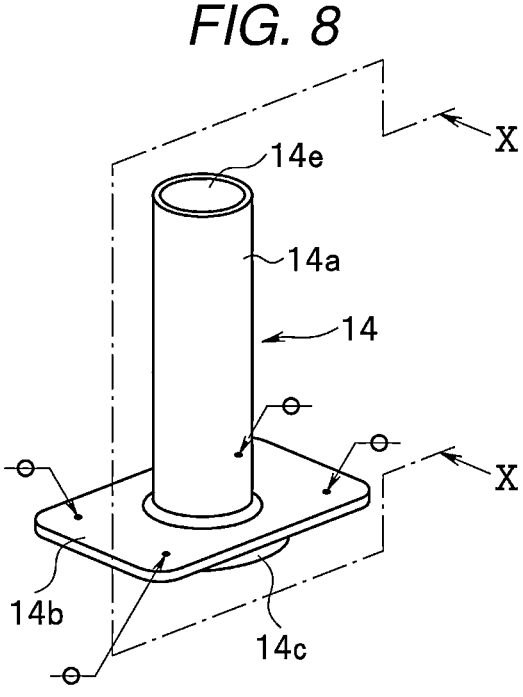
FIG. 8 is a perspective view of the spot-welding pipe nut, as viewed obliquely from above.
Figure 9:
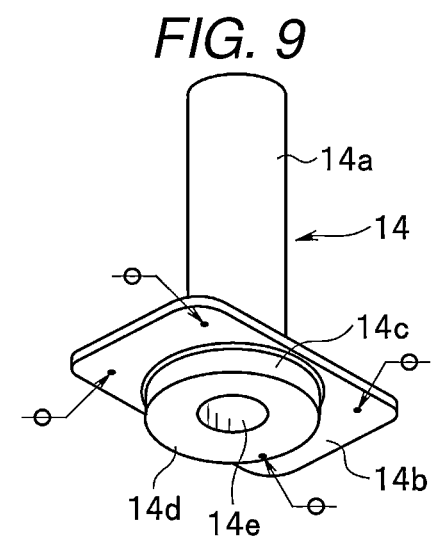
FIG. 9 is a perspective view of the spot-welding pipe nut, as viewed obliquely from below.
Figure 11:
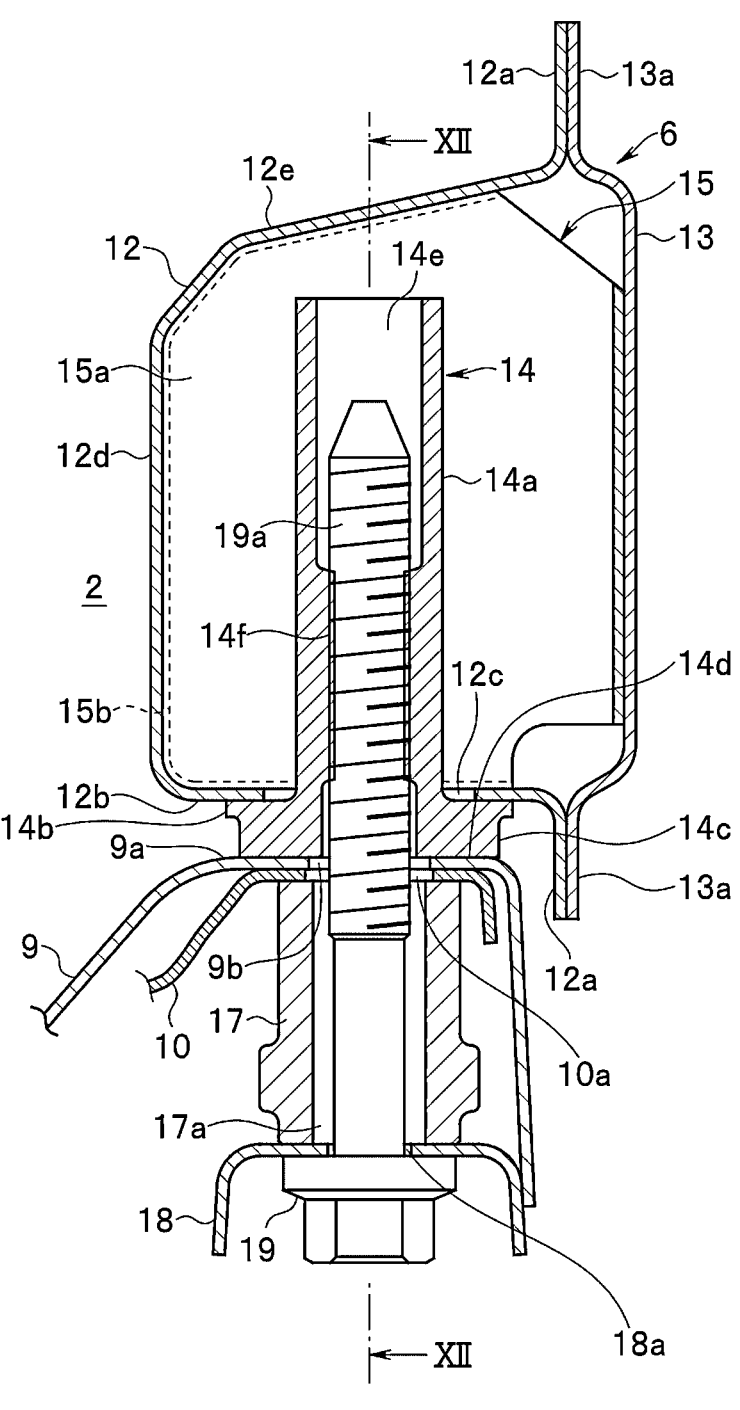
FIG. 11 is a cross-sectional view taken along line XI-XI in FIG. 4.
Figure 12:
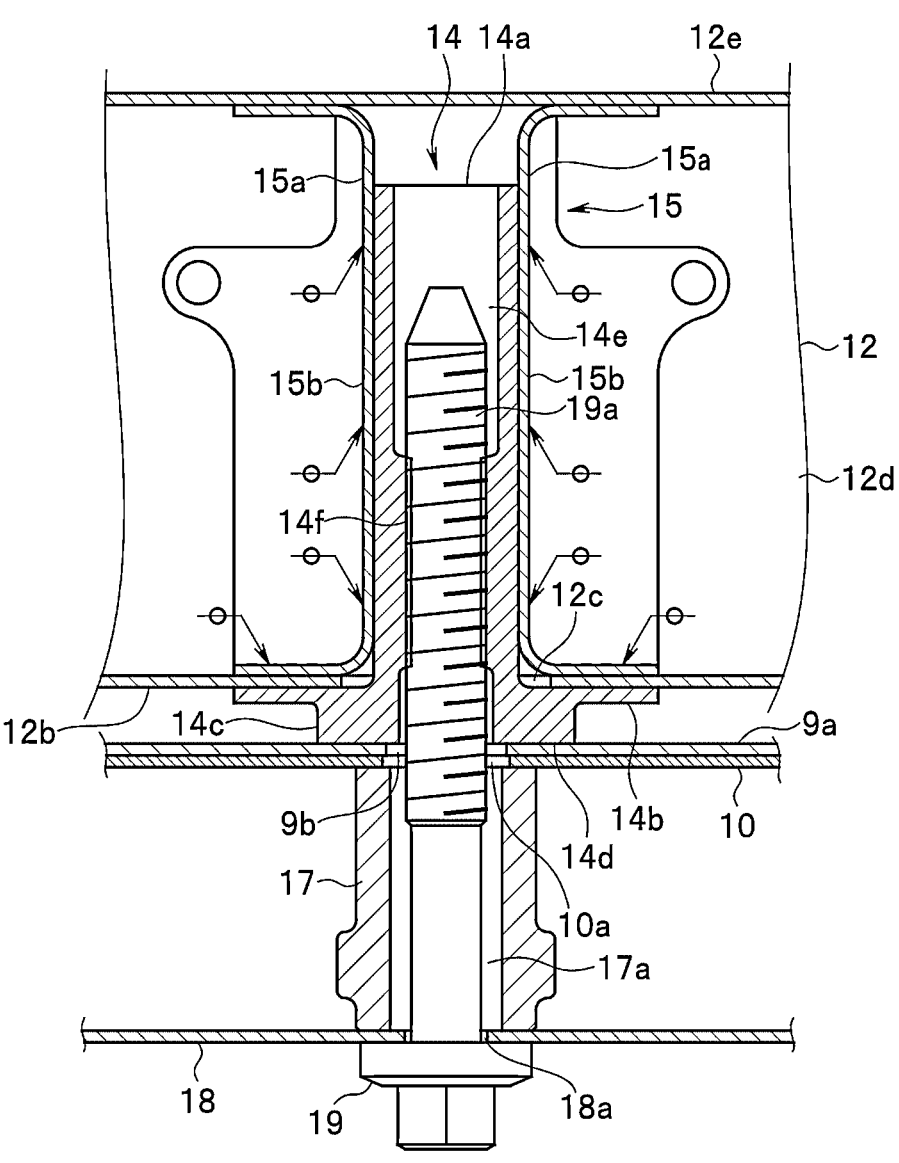
FIG. 12 is a cross-sectional view taken along line XII-XII in FIG. 11.

As illustrated in FIG. 1, bolt insertion holes 9b are provided in the attachment portion 9a of the suspension cross member 9. The bolt insertion holes 9b are provided at two locations in a front-rear direction of the vehicle body at predetermined intervals. As illustrated in FIGS. 11 and 12, a pipe nut insertion hole 12c is provided in the lower side surface 12b of the inner frame 12 corresponding to the bolt insertion hole 9b.

a pipe 14a of a spot-welding pipe nut 14 is inserted into the pipe nut insertion hole 12c from an outside (lower side in the drawing), and the pipe 14a protrudes into the inner frame 12. As illustrated in FIGS. 8 and 9, the spot-welding pipe nut 14 has a coupling flange 14b at a base of the pipe 14a. The spot-welding pipe nut 14 has a boss 14c protruding from a bottom surface of the coupling flange 14b.

The coupling flange 14b has a rectangular shape with a predetermined plate thickness. A longitudinal direction of the coupling flange 14b extends in the front-rear direction of the vehicle body along an outer surface of the lower side surface 12b of the inner frame 12. The boss 14c has an annular shape. An axial center of the pipe 14a and a center of the boss 14c are disposed at a center of the coupling flange 14b. A seat surface 14d is provided on an end surface of the boss 14c. The attachment portion 9a of the suspension cross member 9 abuts against the seat surface 14d.

Figures 4, 5:
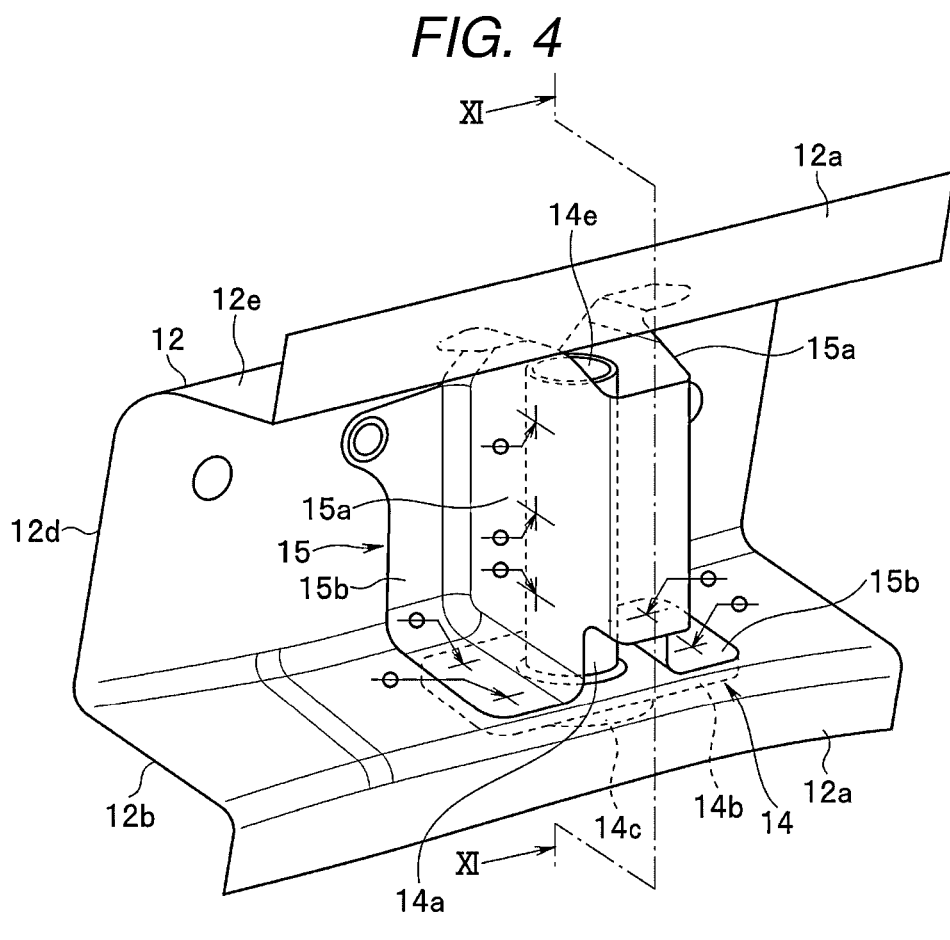
FIG. 4 is an enlarged view of IV in FIG. 3.
FIG. 5 is a perspective view of the separator removed from FIG. 3.
Figure 6:
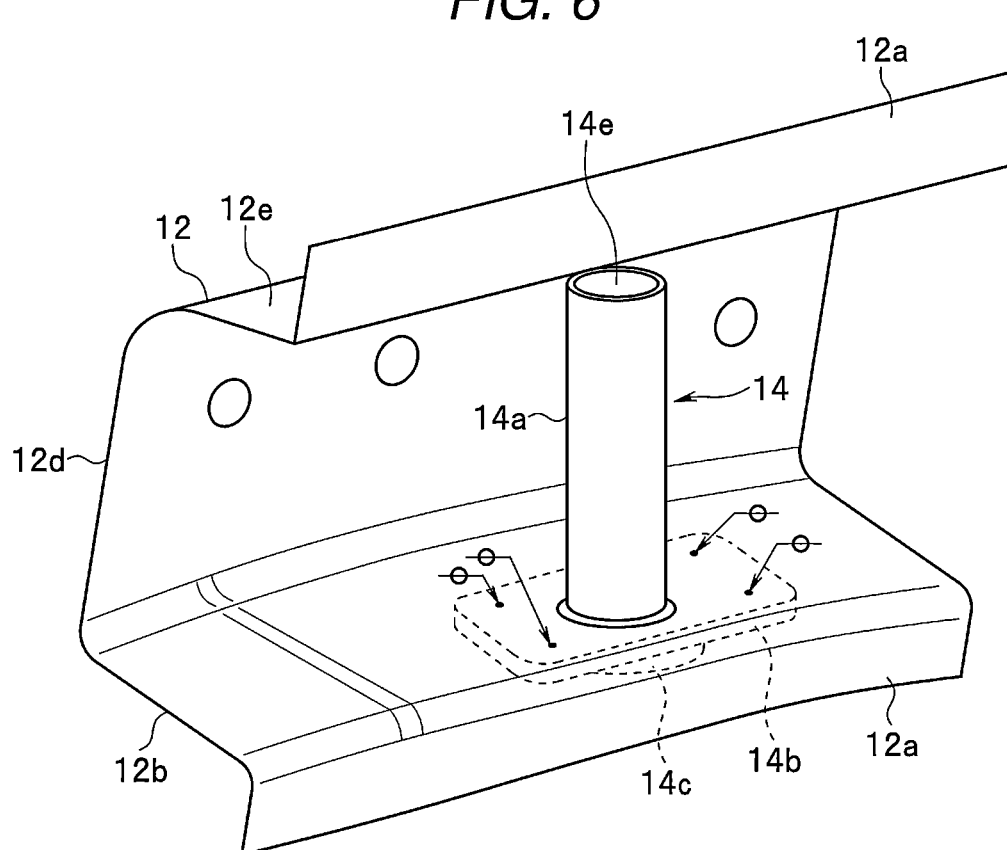
FIG. 6 is an enlarged view of VI in FIG. 5.
Figure 10:
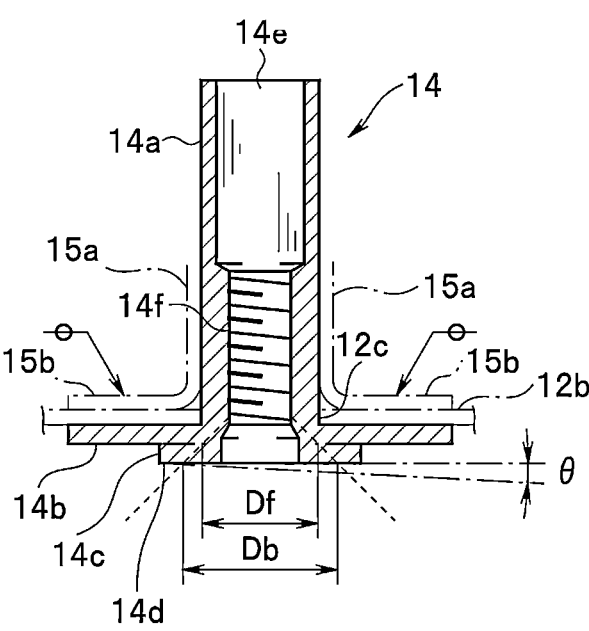
FIG. 10 is a cross-sectional view taken along line X-X in FIG. 8.

As illustrated in FIG. 10, a bolt insertion hole 14e is provided in and passes through the pipe 14a, the coupling flange 14b, and the boss 14c of the spot-welding pipe nut 14. A female thread 14f is provided in a middle of the bolt insertion hole 14e. As illustrated in FIGS. 5 and 6, the coupling flange 14b of the spot-welding pipe nut 14 and a flange 15b of a separator 15, described later, sandwich the lower side surface 12b of the inner frame 12 and are coupled to each other in a three-layered manner.

Figure 7:
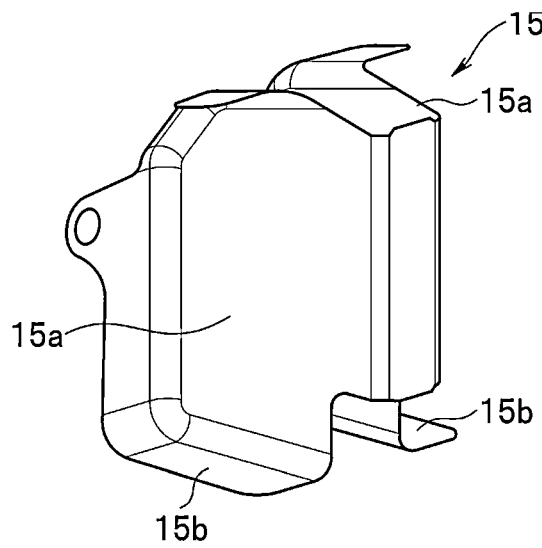
FIG. 7 is a perspective view of the separator.

The pipe 14a of the spot-welding pipe nut 14 is surrounded by the separator 15. As illustrated in FIG. 7, the separator 15 is made of a sheet metal bent into a groove in a plan view. An opening side of the separator 15 is opposed to an inner surface (hereinafter, referred to as a "frame inner surface") 12d of the inner frame 12 in the vehicle width direction. As illustrated in FIG. 12, an inner width between side surfaces 15a of the separator 15 in the front-rear direction of the vehicle body is the same as or slightly wider than a diameter of the pipe 14a.

The flange 15b is bent outward from an upper edge, a rear edge, and a lower edge of the side surface 15a. The flange 15b is coupled to an upper side surface 12e, the frame inner surface 12d, and the lower side surface 12b of the inner frame 12. The coupling flange 14b of the spot-welding pipe nut 14 is opposed to a lower surface of the flange 15b in the vehicle width direction, with the lower side surface 12b of the inner frame 12 sandwiched therebetween. Four corners of the coupling flange 14b are coupled to the lower side surface 12b of the inner frame 12 and the separator 15 in a three-layered manner.

As illustrated in FIG. 12, the flange 15b of the separator 15 has substantially the same width as the coupling flange 14b provided on the spot-welding pipe nut 14. An outer surface of the separator 15 in the vehicle width direction abuts against or is close to an inner surface of the outer frame 13. The pipe 14a provided on the spot-welding pipe nut 14 is sandwiched between the inner surfaces of the separator 15 in the front-rear direction of the vehicle body and is coupled to and supported by the inner surfaces of the separator 15. Therefore, even when the pipe 14a receives a vibration from the suspension cross member 9 in the front-rear direction of the vehicle body, the pipe 14a is prevented from falling in this direction.

As illustrated in FIGS. 11 and 12, the attachment portion 9a of the suspension cross member 9 abuts against the seat surface 14d formed provided the boss 14c of the spot-welding pipe nut 14. The reinforcement 10 coupled to the rear surface of the attachment portion 9a is provided with a bolt insertion hole 10a that penetrates the bolt insertion hole 9b provided in the attachment portion 9a. A support bracket 18 abuts against a rear surface of the reinforcement 10 via a collar 17. The support bracket 18 is provided with a bolt insertion hole 18a that penetrates a bolt insertion hole 17a provided in the collar 17.

The suspension cross member 9, the reinforcement 10, the collar 17, and the support bracket 18 are permanently affixed in advance. The bolt insertion holes 9b, 10a, 17a, and 18a provided in the components 9, 10, 17, and 18 are coaxially disposed. In the following description, the bolt insertion holes 9b, 10a, 17a, and 18a of the components 9, 10, 17, and 18 are collectively referred to as "through holes A" for convenience. The support bracket 18 holds, for example, both ends of a stabilizer that extends left and right in the vehicle width direction.

The attachment portion 9a provided on the suspension cross member 9 abuts against the seat surface 14d of the spot-welding pipe nut 14. A bolt (hereinafter, referred to as a "suspension cross bolt") 19 that fastens the suspension cross member 9 from below is inserted through the through hole A provided in the attachment portion 9a. A thread 19a of the suspension cross bolt 19 is threaded into the female thread 14f provided in the spot-welding pipe nut 14. The suspension cross member 9 is fixed to the side frame 6 by fastening the suspension cross bolt 19.

In such a configuration, the coupling flange 14b provided on a base of the spot-welding pipe nut 14 abuts against the lower side surface 12b of the inner frame 12, and the four corners of the coupling flange 14b are coupled to the lower side surface 12b by spot welding. Thus, productivity is good, and stability of welding quality for each product can be maintained. Further, the coupling flange 14b has a rectangular shape extending in the front-rear direction along the lower side surface 12b of the inner frame 12. Therefore, the coupling flange 14b can be fixed to the lower side surface 12b of the inner frame 12 in a wide area.

As a result, even when a vibration in the front-rear direction of the vehicle body is transmitted to the spot-welding pipe nut 14 from the suspension cross member 9 during traveling, a stress due to the vibration can be distributed to an inner frame 12 side over a wide area. Since the stress due to the vibration is distributed over a wide area toward the inner frame 12 side, a stress concentration on the spot-welding pipe nut 14 is avoided. By avoiding the concentration of the stress on the spot-welding pipe nut 14, rigidity of the spot-welding pipe nut 14 can be relatively increased.

Further, the coupling flange 14b is coupled to the lower side surface 12b of the inner frame 12 and the flange 15b of the separator 15 that abuts against the upper surface of the lower side surface 12b in a three-layered manner. Therefore, even when a vibration from the suspension cross member 9 is transmitted to the spot-welding pipe nut 14 during traveling, a stress generated by the vibration can be widely distributed to inner frame 12 and separator 15 sides. As a result, the rigidity of the spot-welding pipe nut 14 can be further increased.

The boss 14c protrudes from the bottom surface of the flange 14b of the spot-welding pipe nut 14. The seat surface 14d is provided on a bottom surface of the boss 14c. The attachment portion 9a of the suspension cross member 9 abuts against the seat surface 14d. When the flange 14b is coupled to the lower side surface 12b of the inner frame 12 by spot welding, a slightly raised impression is formed around a member against which an electrode is pressed. The attachment portion 9a abuts against the seat surface 14d at the boss 14c protruding from the flange 14b.

Therefore, the attachment portion 9a can be brought into surface abutment against the seat surface 14d without being affected by the impression generated by spot welding. As a result, the attachment portion 9a of the suspension cross member 9 can be fastened and fixed to the side frame 6 with high rigidity via the suspension cross bolt 19.

Further, the flange 14b is coupled to the inner frame 12 by spot welding. Since sputtering is less likely to occur in spot welding, it is not intended to cover the seat surface 14d with a masking material. As a result, a process of attaching and detaching the masking material can be omitted, and productivity can be improved.

For example, as illustrated in FIG. 10, in a production process, when it is determined that the seat surface 14d and the attachment portion 9a of the suspension cross member 9 are inclined by an angle θ and that surface accuracy is not obtained, the inclination of the angle θ can be easily corrected by cutting or grinding the seat surface 14d at the boss 14c using a machining center or the like. Accordingly, a product defect rate can be reduced.

It is known that when the attachment portion 9a of the suspension cross member 9 is fastened to the spot-welding pipe nut 14 with the suspension cross bolt 19, a fastening force (surface pressure) acts on the attachment portion 9a in a range of a cone of influence. As illustrated by a dashed line in FIG. 10, the cone of influence is a cone drawn at a half apex angle (for example, 45°) determined by a material for the spot-welding pipe nut 14 from an effective diameter near a start of thread cutting at the female thread 14f provided in the spot-welding pipe nut 14 toward the seat surface 14d.

According to a theory of the cone of influence, a stress that is generated in the female thread 14f at the time of fastening the bolt is generated in a range that is widened in a conical shape at the half apex angle. Therefore, on the seat surface 14d, a fastening force by the suspension cross bolt 19 is less likely to be transmitted to a region that exceeds a bottom surface diameter Db of the cone of influence. For example, compared with a bottom surface diameter Df when the seat surface is provided on the coupling flange 14b, the bottom surface diameter Db of the seat surface 14d set on the boss 14c is wider by a height from the coupling flange 14b. As a result, compared with a case where the coupling flange 14b is the seat surface, by using the bottom surface of the boss 14c as the seat surface 14d, a contact area for generating a surface pressure with the attachment portion 9a becomes larger. Accordingly, it is possible to increase fastening rigidity at a contact surface.

Second Embodiment

Figure 13:
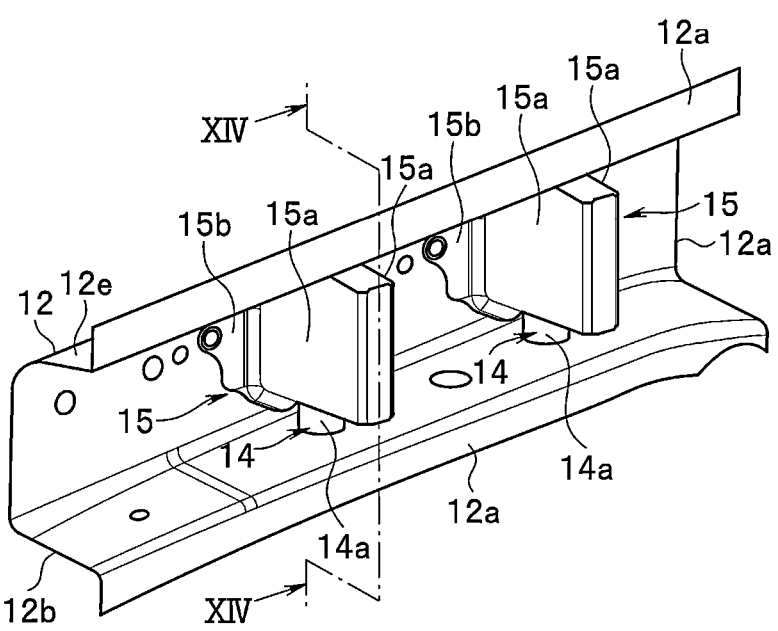
FIG. 13 is a perspective view corresponding to FIG. 3 according to an embodiment.
Figure 14:
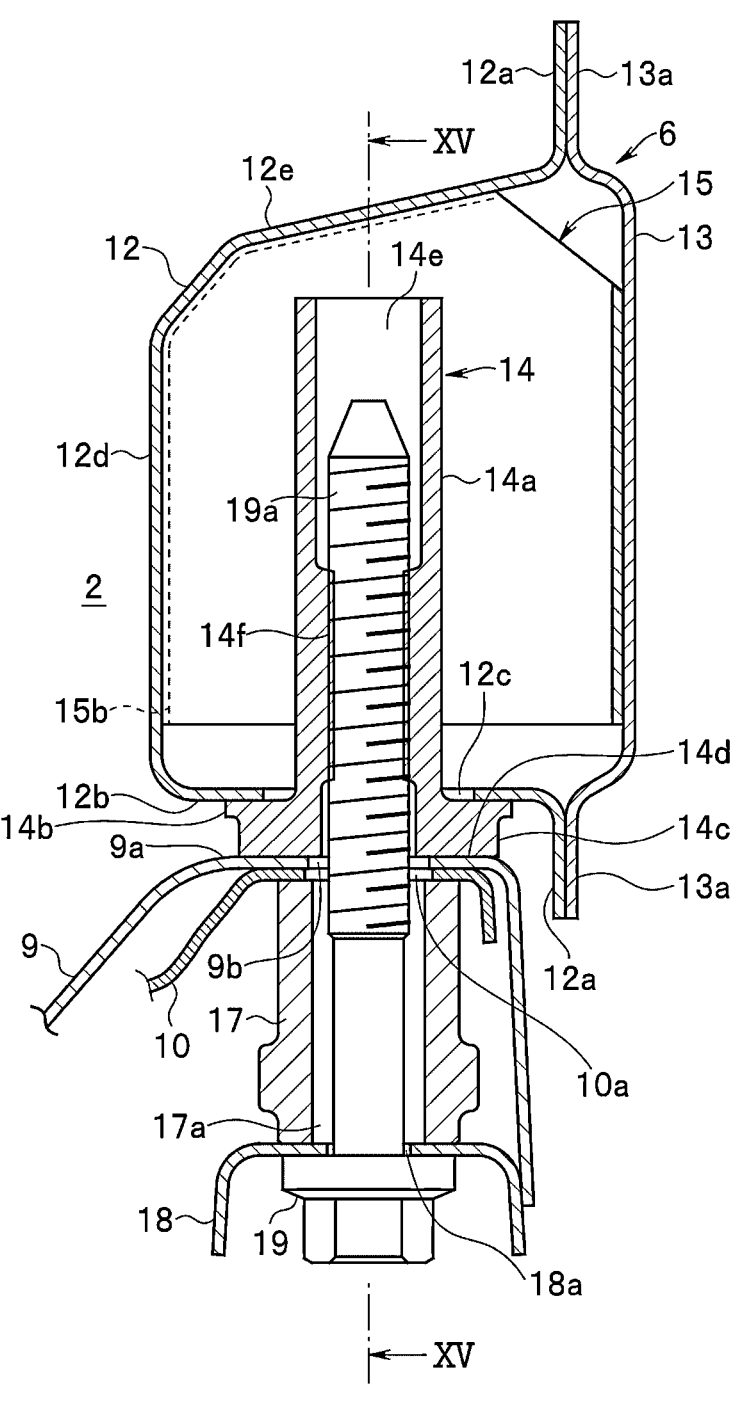
FIG. 14 is a cross-sectional view taken along line XIV-XIV in FIG. 13.
Figure 15:
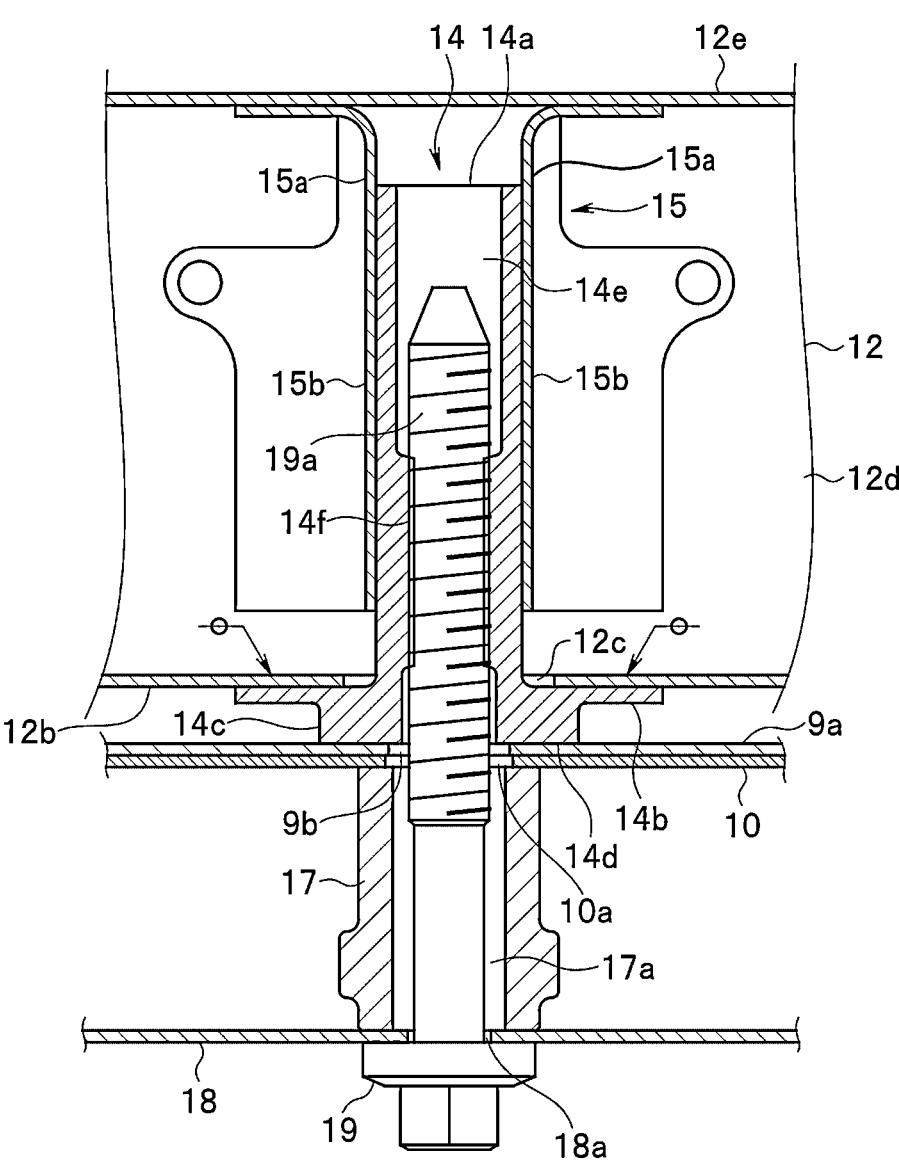
FIG. 15 is a cross-sectional view taken along line XV-XV in FIG. 14.

FIGS. 13 to 15 illustrate a second embodiment of the disclosure. Components similar as those in the first embodiment are denoted by similar reference signs and descriptions thereof are omitted or simplified.

In the first embodiment, the coupling flange 14b of the spot-welding pipe nut 14 is coupled to the lower side surface 12b of the inner frame 12 and the flange 15b of the separator 15 in a three-layered manner.

In contrast, a lower member of the separator 15 in the embodiment is cut. The flange 15b of the separator 15 is not coupled to the lower side surface 12b of the inner frame 12, but is coupled to the frame inner surface 12d and the upper side surface 12e. Other configurations are similar as those of the first embodiment, and thus a description thereof is omitted.

Depending on a type of a vehicle adopted, the separator 15 as in the embodiment can simplify the configuration. In spot welding, the coupling flange 14b of the spot-welding pipe nut 14 and the lower side surface 12b of the inner frame 12 are coupled to each other in a double-layered manner.

A plate thickness of the coupling flange 14b and the lower side surface 12b of the inner frame 12 in double-layered manner is smaller than that of the three-layered manner according to the first embodiment. Therefore, it is not intended to increase a pressing force and a welding current during welding as compared with spot welding in a three-layered manner, and production becomes easy.

The disclosure is not limited to the above-described embodiment. For example, the vehicle body frame is not limited to the side frame 6, and the sub-frame is not limited to the suspension cross member 9.

According to the disclosure, the coupling flange provided at the base of the pipe provided on the welding pipe nut is coupled to the outer surface of the vehicle body frame by spot welding, the boss protrudes from a surface of the coupling flange on a side opposite to the pipe, the attachment portion of the sub-frame abuts against the boss and the seat surface is provided, and the attachment portion is fastened to the seat surface by the bolt. Therefore, the attachment portion can be in surface abutment against the seat surface and fastened to the seat surface without being affected by the impression formed by spot welding. As a result, rigidity of a fastener between the vehicle body frame and the sub-frame is not lowered, stability of welding quality can be maintained, and favorable productivity can be obtained.

The invention claimed is:

1. A vehicle body fastener structure comprising:
a vehicle body frame disposed on a vehicle body;
a sub-frame including an attachment portion attached to the vehicle body frame;
a welding pipe nut coupled to the vehicle body frame; and
a bolt fastening the attachment portion of the sub-frame to the welding pipe nut, wherein
the welding pipe nut comprises
a pipe inserted through the vehicle body frame from an outside and having a female thread, and
a coupling flange provided at a base of the pipe and coupled to an outer surface of the vehicle body frame,
the attachment portion of the sub-frame is fastened to the welding pipe nut with the bolt threaded into the female thread,
the coupling flange is coupled to the outer surface of the vehicle body frame by spot welding,
a boss protrudes from a surface of the coupling flange facing the pipe across the coupling flange,
a seat surface is provided on an end surface of the boss, and
the attachment portion of the sub-frame abuts against the seat surface and is fastened with the bolt.

2. The vehicle body fastener structure according to claim 1, further comprising:
a separator covering the pipe of the welding pipe nut, wherein
a flange provided on the separator is coupled to the sub-frame.

3. The vehicle body fastener structure according to claim 2, wherein
the coupling flange of the welding pipe nut is coupled, by spot welding, to the flange provided on the separator such that the vehicle body frame sandwiched between the coupling flange and the flange.

4. The vehicle body fastener structure according to claim 1, wherein
the coupling flange has a rectangular shape and a longitudinal direction thereof extends along the vehicle body frame.

5. The vehicle body fastener structure according to claim 1, wherein
the vehicle body frame is a front side frame provided on each of a left and a right of a vehicle body front in a vehicle width direction, and
the sub-frame is a suspension cross member.

6. The vehicle body fastener structure according to claim 2, wherein the vehicle body frame is a front side frame provided on each of a left and a right of a vehicle body front in a vehicle width direction, and the sub-frame is a suspension cross member.

7. The vehicle body fastener structure according to claim 3, wherein the vehicle body frame is a front side frame provided on each of a left and a right of a vehicle body front in a vehicle width direction, and the sub-frame is a suspension cross member.

8. The vehicle body fastener structure according to claim 4, wherein the vehicle body frame is a front side frame provided on each of a left and a right of a vehicle body front in a vehicle width direction, and the sub-frame is a suspension cross member.

\*  \*  \*  \*  \*